June 13, 1961

J. STEPHEN 2,988,272

CALCULATING MACHINE DRIVE APPARATUS

Filed Oct. 25, 1956

INVENTOR.
JAMES STEPHEN
BY Fidler, Crouse and Beardsley
ATTORNEYS

INVENTOR.
JAMES STEPHEN
BY Fidler, Crouse and Beardsley
ATTORNEYS

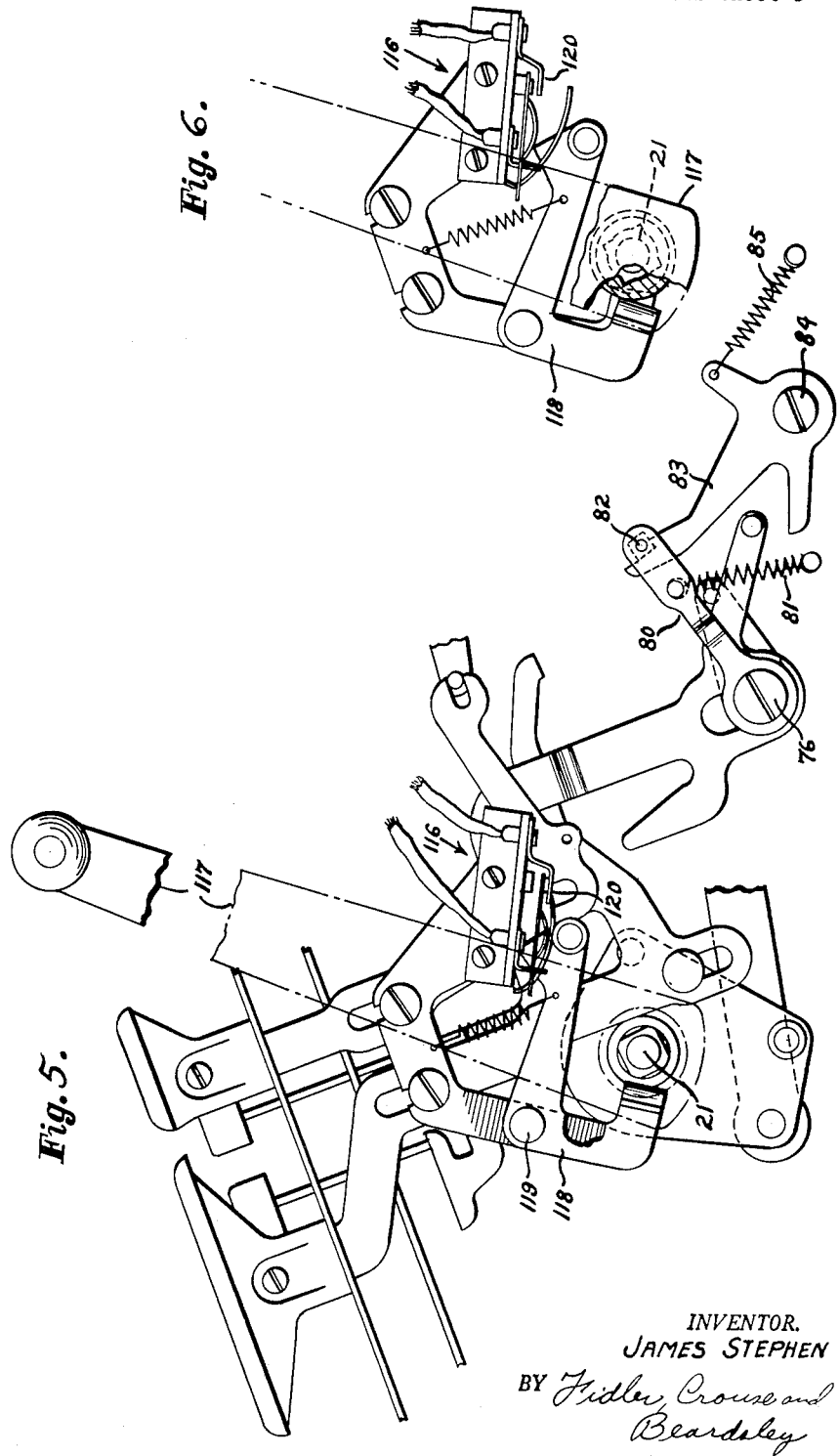

June 13, 1961  J. STEPHEN  2,988,272
CALCULATING MACHINE DRIVE APPARATUS
Filed Oct. 25, 1956  6 Sheets-Sheet 6
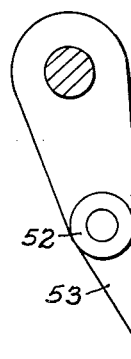
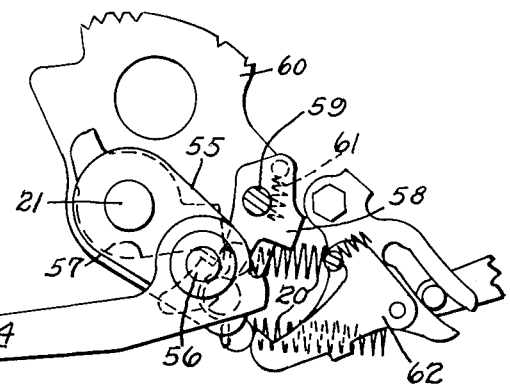
Fig. 8.
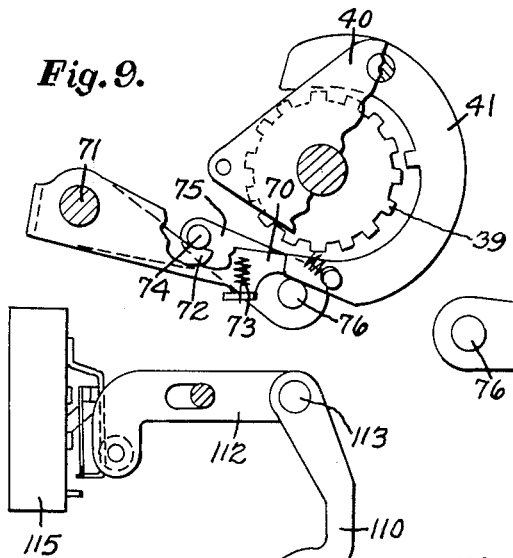
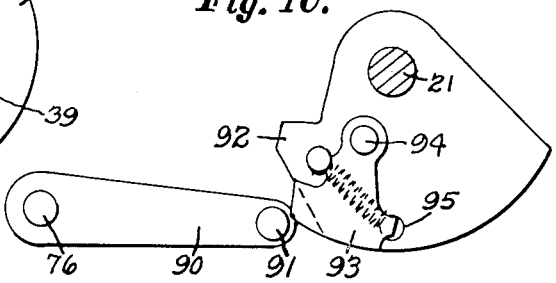
Fig. 9.
Fig. 10.
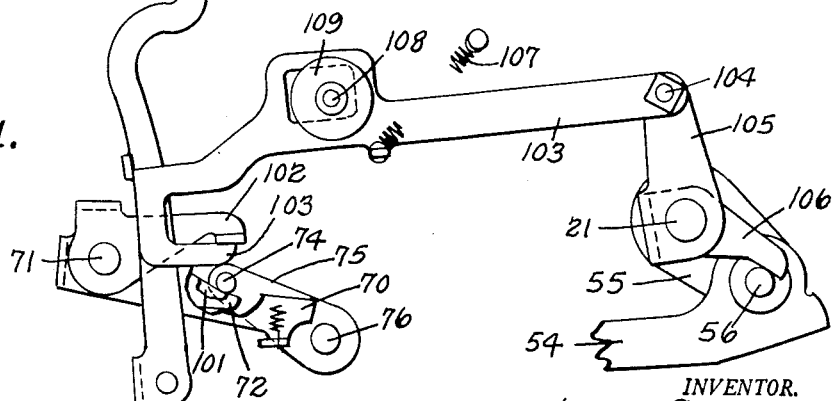
Fig. 11.
INVENTOR.
JAMES STEPHEN
BY
Fidler, Berkeley & Bradley

United States Patent Office 2,988,272
Patented June 13, 1961

2,988,272
CALCULATING MACHINE DRIVE APPARATUS
James Stephen, Bearsden, Scotland, assignor to Burroughs Corporation, Detroit, Mich., a corporation of Michigan
Filed Oct. 25, 1956, Ser. No. 618,277
2 Claims. (Cl. 235—62)

This invention relates to improved drive means for a motor driven calculating machine and it is an object of the invention to provide improved apparatus of that character.

In motor driven calculating machines of various types there are a number of operating parts or load devices which must be driven by the motor. These load devices operate in a prescribed sequence and therefore impose their loads on the drive means at different times in the operating cycle of the machine, with the result that the instantaneous net load on the motor tends to vary throughout that cycle. Generally the drive means includes a single, main drive shaft, or other moving part, which drives all or substantially all of the load devices, and spring means, commonly called a base spring or base springs, are conventionally employed to bias this main drive shaft in one direction. The base spring is sufficiently strong that it is capable of applying the required driving force during one portion of the operating cycle, sometimes referred to as the return stroke. The use of a base spring for supplying the required power for the return stroke of the operating cycle is desirable since the base spring exerts a limited, resilient force which cannot harm the machine. Accordingly, the motor is called upon to operate the various load devices only during a first portion, or forward stroke, of the operating cycle, during which time it must also energize the base spring.

In the case of a motor operated calculating machine, this conventional arrangement has a distinct disadvantage in that during the forward stroke the motor carries a double load, since it drives the various load devices and at the same time energizes the base spring. During the return stroke the base spring provides the required power with the result that the motor idles through this return stroke. A motor is therefore required which has twice the power which would be required to drive the load devices alone through their forward and return strokes.

According to the present invention, load distributing means are operatively connected to the drive means to distribute the combined load of the various load devices and the base spring over the forward and return strokes of the machine. Furthermore, the load distributing means are so constructed that a force or torque applied to the drive means thereby during the forward stroke may nearly complement the combined load, including the various load devices and the base spring, such that a relatively small and relatively steady load is carried by the motor throughout substantially the entire operating cycle, including the forward and return strokes thereof.

An important feature of the invention is that a single load distributing means is operatively connected to the drive means and is so constructed as substantially to complement the combined net load imposed by the plurality of load devices and the return spring. Furthermore, the single load distributing means may produce not only an averaging of the load as between forward and return strokes, but also substantially throughout both the forward stroke and the return stroke.

Accordingly, it is another object of the invention to provide improved load distributing means associated with the drive means of a motor operated calculating machine, which means distribute the load on the motor between the forward stroke and the return stroke of the machine cycle.

It is another object of the invention to provide improved load distributing means associated with the drive means of a motor operated calculating machine which distribute the load on the motor substantially evenly throughout nearly the entire operating cycle of the machine, including both the forward and return strokes.

It is another object of the invention to provide improved apparatus of the character described above which is efficient, reliable and economical to produce.

This invention, together with further objects and advantages thereof, will best be understood by reference to the following description taken in connection with the accompanying drawings, and its scope will be pointed out in the appended claims.

In the drawings, in which like parts are designated by like reference numerals:

FIG. 5 is a partial elevational view of certain control apparatus incorporated in the machine of FIG. 1 and viewed from the opposite side;

FIG. 6 is an enlarged view of a portion of the control apparatus of FIG. 5, shown in a different operating position;

FIG. 8 is an enlarged view of a portion of the linkage which connects the main drive shaft to the drive motor and to the return springs;

FIG. 9 is an enlarged view of the main drive clutch and a portion of the clutch control mechanism;

FIG. 10 is an enlarged view of another portion of the clutch control mechanism; and FIG. 11 is an enlarged view of a portion of the motor control apparatus.

Figure 1:
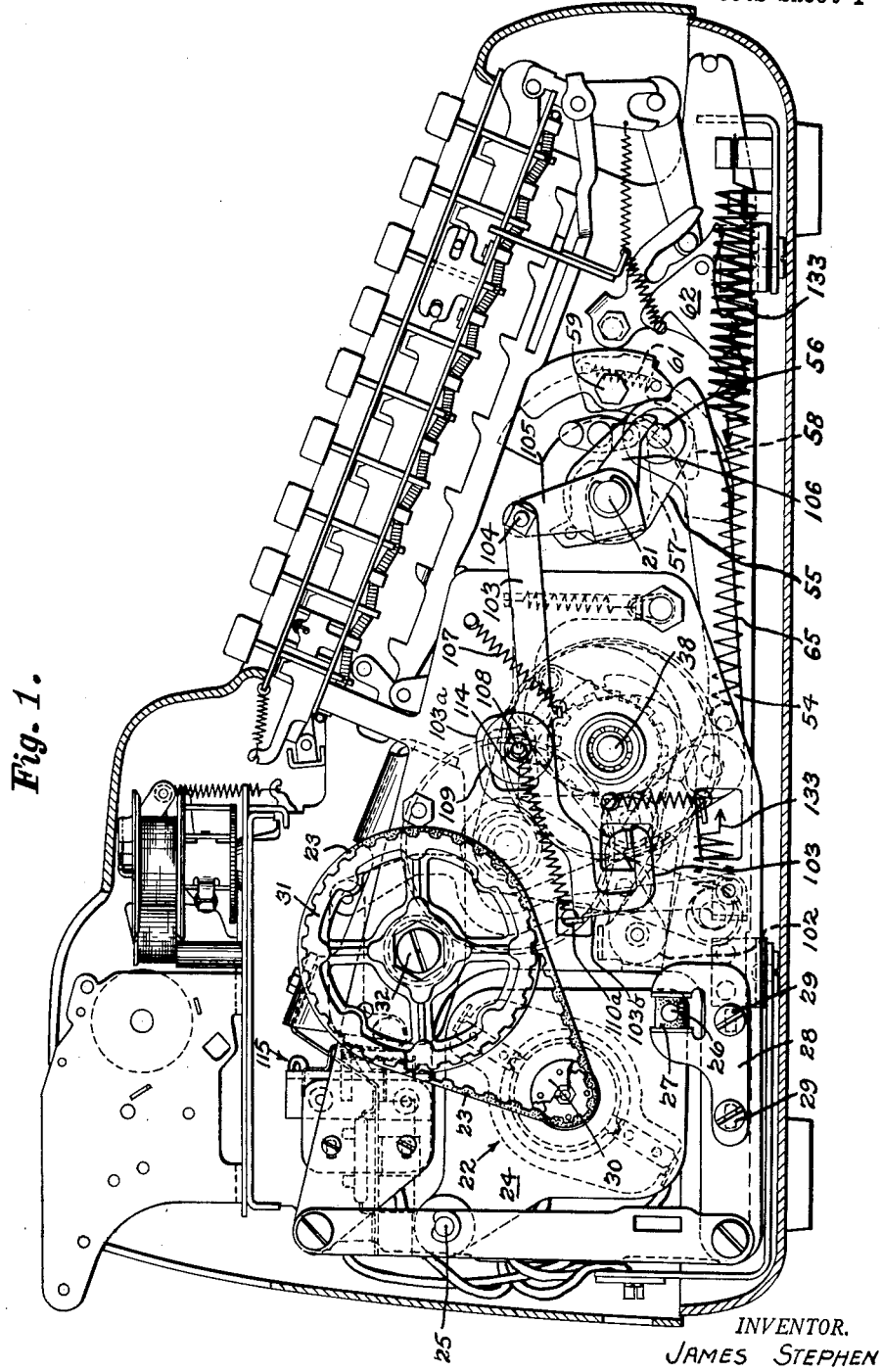
FIG. 1 is a side elevational view of a calculating machine illustrating one embodiment of the invention, with the side plate removed.

In the drawings some portions of a calculating machine proper are illustrated, but these are not shown in detail or described herein. Only the drive apparatus and the controls associated therewith, including the load distributing means, are shown and described in detail. It is to be understood that apparatus having the features incorporated in the illustrated embodiment of the invention may be applied to various forms of calculating machines. One particular form of calculating machine to which drive means constructed in accordance with the present invention may be readily applied is that shown in Patent No. 1,853,050, issued April 12, 1932, to Allen A. Horton, and assigned to the same assignee as the present application.

As will readily be understood by those skilled in the art, the various operating parts of a calculating machine constitute a plurality of individual load devices operable at different times during the operating cycle of the machine. Typical of these are the various elements of a differential mechanism, printing mechanism, ribbon mechanism, line-spacing mechanism, totalizers and totalizer-engaging mechanisms, and the transfer mechanisms. These various operating parts are listed merely as typical of certain types of calculating machines.

In a calculating machine of the type shown in Patent No. 1,853,050 referred to above, these various load devices are operated through a main operating member such as a drive shaft, this drive shaft being driven through a forward stroke by the motor (or a crank in a manually operated machine) and through a return stroke by a suitable base spring or springs which act on the main drive shaft and are energized by the motor during the forward stroke. Such base springs are designated by the reference numeral 96 in Patent No. 1,853,050 and by the reference numeral 20 in the present application. Some operating parts are operated by the main drive member in its motor driven forward stroke and later restored by individual springs, whereas other operating parts are merely released by the drive member, during its forward stroke, for operation by individual spring means which are again retensioned as those operating parts are returned to their normal positions by the main drive member as the latter is moved through its return stroke by the base springs. All the operating parts ultimately receive their driving force from the motor since the motor energizes the base springs during the forward stroke. Accordingly, the energy required to operate such a machine is supplied by the motor through the main drive shaft during the forward stroke, the base springs and some of the load devices being driven by the motor during the forward stroke, and other load devices being driven only by the motor-energized base springs during the return stroke.

Reference is made herein to a forward and return stroke and it is to be understood that such nomenclature is to be interpreted broadly, the forward stroke being that portion of the operating cycle in which the drive means actuate some or all of the various load devices and energize the base springs, and the return stroke being that portion of the operating cycle of the machine during which the base springs drive the load devices, regardless of which stroke may occur first in the operating cycle.

When a motor drive is applied to such a calculating machine it will be apparent that the motor is, in effect, serving double duty during the forward stroke, since the full load for the entire machine cycle is imposed on the motor during the forward stroke. The motor then idles during the return stroke. It will be apparent that in this case a motor must be provided which has twice the maximum torque and power as that which would be required if the load were distributed over the forward and return strokes.

Furthermore the load distribution during the forward stroke is irregular since the various load devices are caused to operate during different portions of the forward stroke. Apparatus constructed in accordance with the present invention may not only provide for the distribution of the combined net load over the forward and return strokes, but may, furthermore, distribute the load substantially evenly over substantially the entire forward and return strokes of the machine. Accordingly, while the invention is particularly applicable to a calculating machine of the type having a motor driven forward stroke and a spring driven return stroke, it may also be applied to advantage in any calculating machine in which the various load devices and any base springs or return springs impose on the motor a combined load which varies substantially during an operating cycle of the machine.

*Drive apparatus*

The basic drive system illustrated in the drawings includes a main drive shaft 21 which is driven through suitable drive means by a motor generally designated 22. The motor causes rotation of the shaft 21 through an angle of approximately 90 degrees, and permits the return of that shaft to its original position under the influence of the base springs 20. The motor 22 is preferably adjustably positioned in order that a belt 23, through which it drives the machine, may be brought to the proper tension. For this purpose, end plates 24 of the motor are pivotally mounted as at 25 and carry pins 26 imbedded in rubber plugs 27 which are in turn set in clamps 28. The clamps are adjustably positioned on the frame of the machine through screws 29 whereby the motor 22 may be caused to pivot in a direction to loosen or tighten the belt 23.

The motor 22 drives the belt 23 through a pulley 30 and the belt in turn drives a larger pulley 31. As seen best in the exploded view of FIG. 3, the pulley 31 is secured to a rotatable shaft 32. Also secured to the shaft 32 are a pinion 33 and a governor 34'. This governor serves merely to control the speed of the motor 22 and hence of the shaft 32, and since it may be purchased on the open market and does not of itself constitute a feature of the present invention it is not described in detail herein.

The pinion 33 drives a gear 34 which is freely rotatable on a shaft 35, and secured to the gear 34 is another pinion 36. This latter pinion meshes with another gear 37 which is freely rotatable on a shaft 38, and secured to the gear 37 is a pinion 39 which constitutes a clutch member. It will now be seen that whenever the motor 22 is operating, all of the drive mechanism from the motor to the pinion or clutch member 39 is continuously driven at a constant speed. Those portions of the main drive mechanism subsequently to be described operate only when the clutch member 39 is engaged with its cooperating clutch member.

The shaft 38 upon which the gear 37 and the clutch member 39 freely rotate is, itself, rotatable, and has fixed thereto a plate 40 which pivotally supports a clutch member 41 through a pin 40a. The clutch member 41 carries a single tooth 42 which may enter between two adjacent teeth of the pinion or clutch member 39 such that the two clutch members are engaged and the clutch member 41 may be driven by the clutch member 39. A spring 43 may be seen connected at one end to the plate 40 through a pin 44 and at its other end to the clutch member 41 through a pin 45, the spring 43 urging the clutch member 41 into engagement with the clutch member 39. It will now be understood that when the spring 43 is thus permitted to bring the two clutch members into driving engagement, the clutch member 41 drives the plate 40 and hence causes rotation of the shaft 38. Means for effecting engagement and disengagement of the clutch members 39 and 41 are described below.

Figure 3:
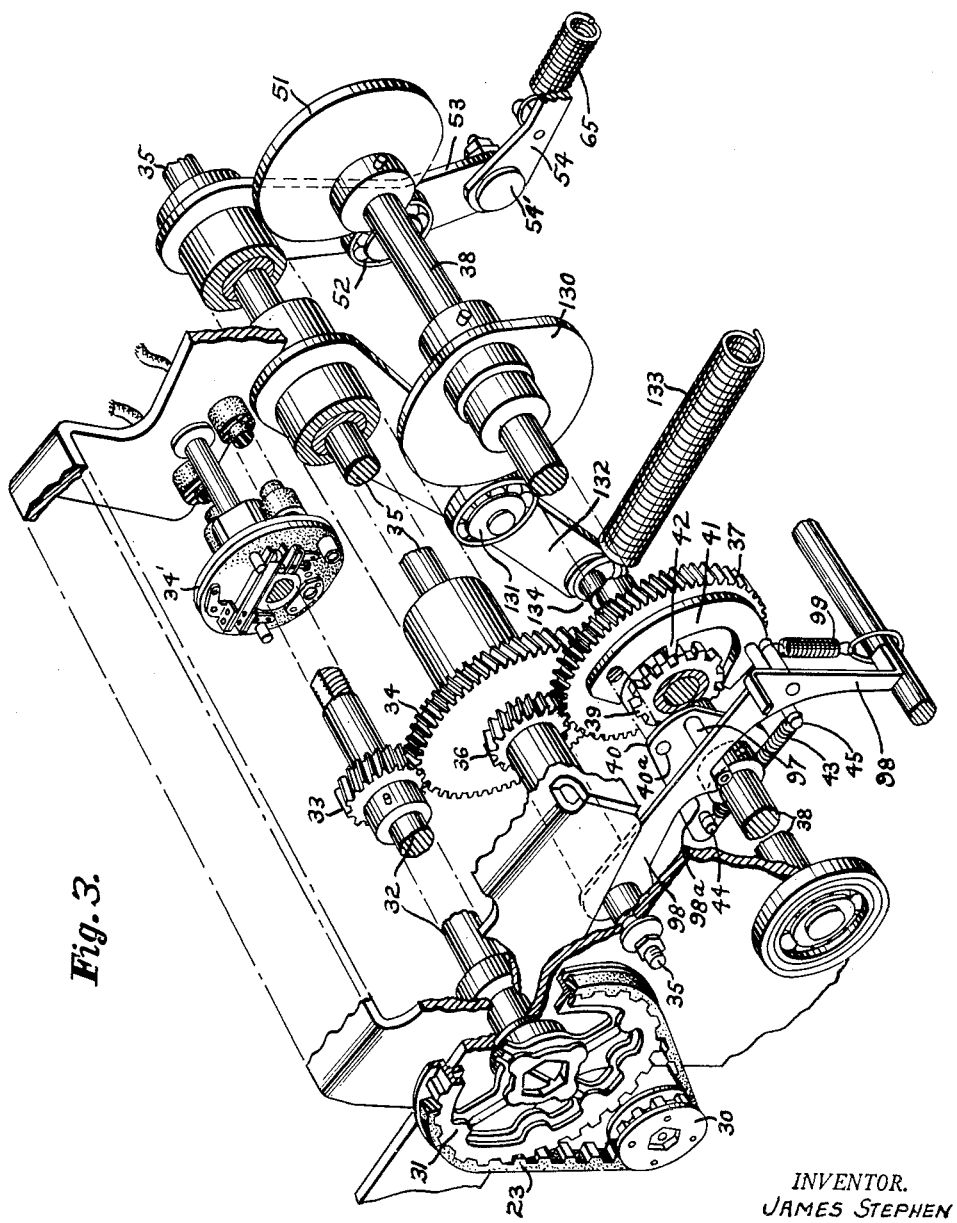
FIG. 3 is an exploded perspective view of a portion of the apparatus seen in FIGS. 1 and 2.

The main drive apparatus also includes a cam 51 secured to the right-hand end of the shaft 38 as viewed in FIG. 3. This cam cooperates with a cam follower 52 which is rotatably supported on an arm 53 which is in turn pivotally mounted at its upper end on the above-mentioned shaft 35.

At the lower end of the arm 53, a link 54 is pivotally secured thereto through a suitable pin 54'. As best seen in FIGS. 1 and 8, the link 54 is pivotally connected to an arm 55 through a pin 56, the arm 55 being freely rotatable on the shaft 21. A second arm 57 is secured to the arm 55 and is preferably integral therewith, the two arms being spun on an intermediate hub freely pivotable on shaft 21. The arm 57 may be seen in FIG. 1 to engage a hook member 58 which is pivotally mounted through a pin 59 on a disklike member 60 (FIG. 2) which is commonly referred to as a full stroke sector. This full stroke sector is secured to the shaft 21 and to the spring 20 which rotates the sector 60 counterclockwise during the return stroke of the machine. The hook member 58 is biased in a clockwise direction by a spring 61 whereby it is normally arranged in driving connection with the arm 57.

Figure 2:
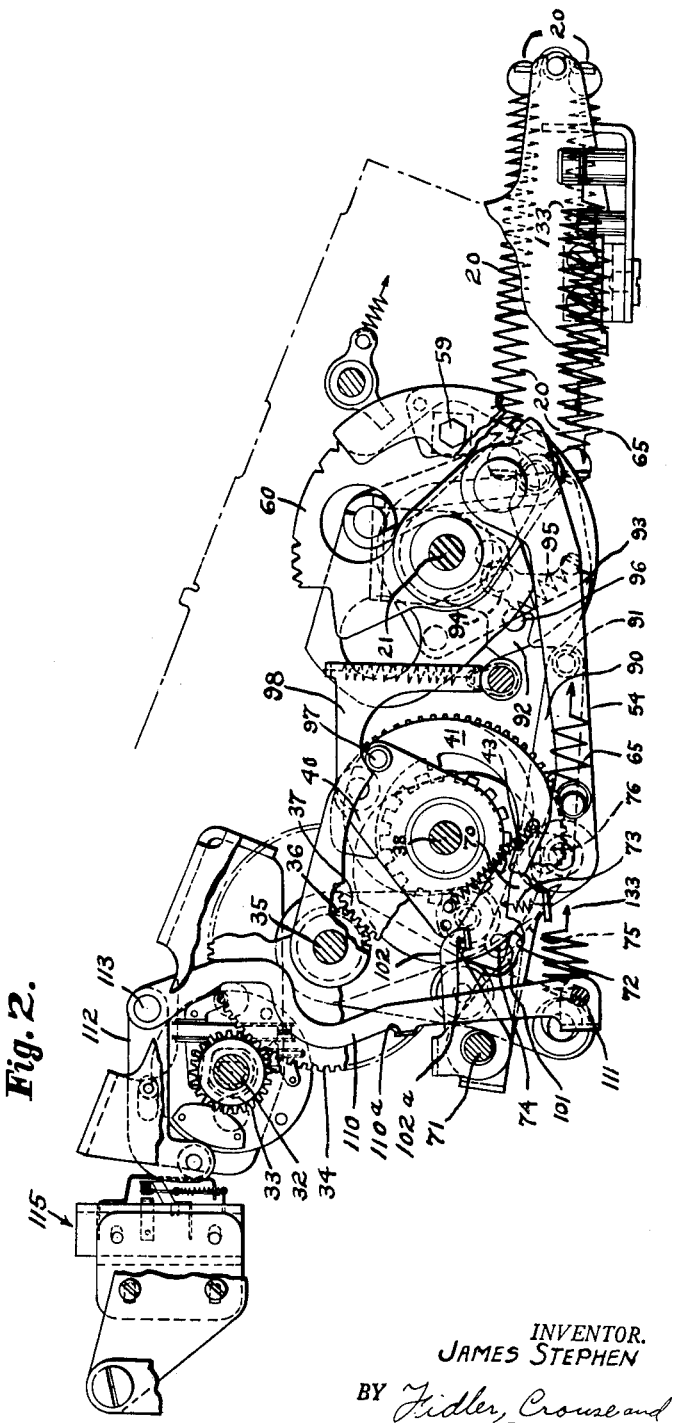
FIG. 2 is a partial side elevational view similar to FIG. 1 but with certain operating parts removed.

It will now be seen that as the link 54 moves rearwardly, or to the left in FIGS. 1 and 2, it causes the arm 55 and hence the arm 57 to rotate in a clockwise direction about the shaft 21. The arm 57 being in engagement with the hook 58 draws the hook, and hence the full stroke sector 60 and the shaft 21, in a clockwise direction. The return spring 20 is stretched during this portion of the machine cycle. When the link 54 returns to the right in FIG. 1 it drives the arms 55 and 57 in a counterclockwise direction and back to their original positions, whereas the hook 58, the full stroke sector 60, and the shaft 21 may lag behind and complete their return strokes along with the various load devices within the calculating machine, all of these being under the influence of return springs 20, and, conventionally, a dashpot for limiting the speed of the return movement. The calculating machine may also include apparatus for disengaging the hook 58 from the arm 57 during the forward stroke to prevent operation of the calculating machine when it is improperly conditioned for operation as disclosed in the Horton Patent No. 1,853,050. Since this does not of itself constitute a feature of the present invention it is not illustrated or described in detail herein. For the purpose of disclosing the present invention, it is believed to be sufficient to point out that a hook 62 may be pivoted in a clockwise direction to lie in the path of a shoulder on the hook 58. When a forward stroke is initiated, the hook 58 may be engaged by the hook 62 and be caused to pivot in a counterclockwise direction about the pin 59 such that it is disengaged from the arm 57. Conditions under which such movement of the hook 62 and the consequent disengagement of the driving apparatus are desired are explained in Patent No. 1,853,050 and need not be discussed herein. As seen best in FIG. 2, the link 54 is biased forward by a spring 65, this spring being connected at one end to the link and at its other end to the frame of the machine. In the event of disengagement of the hook 58 and the arm 57 by the hook 62 after initiation of an operating cycle, the motor and the arm 57 and all of the drive means intermediate these parts will complete their operating cycle and return to normal position even though the various load devices remain stationary, all as will subsequently become apparent.

*Clutch control apparatus*

Engagement or disengagement of the clutch members 39 and 41 is accomplished by apparatus best shown in FIGS. 2 and 9. An arm 70, which is freely mounted on a shaft 71, may be seen to lie in the path of the clutch member 41 such that the clutch member is maintained out of engagement with the clutch member 39. The arm 70 is preferably integral with an arm 72, the two arms 70 and 72 forming a yoke construction which is freely pivotable on the shaft 71. The arm 70 and hence the arm 72 are maintained in clutch disengaging position by a spring 73, one end of which is secured to the arm 70 and the other end of which is secured to the frame of the machine. The arm 72 and hence the arm 70 may be forced downwardly by a pin 74 mounted on the arm 75, this arm being secured to a rotatable shaft 76. Rotation of this shaft in a counterclockwise direction as viewed in FIG. 2 moves the arm 75 and hence the pin 74 downwardly and causes the arms 72 and 70 to pivot in a clockwise direction whereby the arm 70 is removed from the path of the clutch member 41. Under these circumstances this clutch member is moved under the influence of the previously mentioned spring 43 into engagement with the clutch member 39.

The shaft 76 extends substantially across the width of the machine and the right hand end thereof, as viewed from the front of the machine, may be seen in FIG. 5. An arm 80 is shown secured thereto, this arm being biased in a clockwise direction as viewed in FIG. 5 by a spring 81 and carrying a pin 82 at its free end. This pin engages a shoulder at the free end of an arm 83 which is pivotable about a shaft 84 and spring biased in a clockwise direction by a spring 85. When the motor bar of the calculating machine is depressed to start operation, it operates in any suitable manner to pivot the arm 83 in a counterclockwise direction against the action of the spring 85. This withdraws the shoulder on the arm 83 from the path of the pin 82 on the arm 80 whereby this latter arm and hence the shaft 76 may be rotated in a clockwise direction by the spring 81. Referring again to FIG. 2, it will be seen that clockwise rotation of the shaft 76 as viewed in FIG. 5 constitutes counterclockwise rotation of this shaft as viewed in FIG. 2. This causes depression of the arm 72 by the pin 74 and release of the clutch element 41 such that it may engage the clutch element 39, all as described above. It has now been shown that depression of the motor bar to start operation of the machine causes engagement of the clutch elements 39 and 41 whereby the motor may drive the shaft 21. It is also necessary that the clutch member be disengaged upon the completion of one cycle of operation. Control apparatus for this purpose is described below.

It should be noticed first, by reference to FIG. 5, that the spring 81 is capable of holding the arm 80 down after the motor bar is released. In other words, the arm 83 acting under the influence of the spring 85 cannot cam the arm 80 back to the position shown in FIG. 5 against the action of the spring 81 because the rear or upper surface of the arm 83 is of such configuration that the clockwise biasing of the arm 83 by the spring 85 produces little or no tendency toward counterclockwise movement of the arm 80. However, if the motor bar has been released and the arm 80 is otherwise caused to reassume the position of FIG. 5, the arm 83 will move in a clockwise direction such that the pin 82 on the arm 80 will again engage the shoulder of the arm 83 whereby the arm 80 will be retained in the position of FIG. 5 until the motor bar is again depressed.

The shaft 76 to which the arm 80 is secured also has attached thereto an arm 90 shown best in FIGS. 2 and 10. This arm has a cam roller 91 rotatably mounted on its forward or right hand end as viewed in FIGS. 2 and 10 and this cam roller is acted upon to cause clockwise rotation of the shaft 76 as viewed in FIGS. 2 and 10 to return the arm 80 to its latched position and to permit movement of the arm 70 upwardly into the path of the clutch element 41. A cam element 92 is shown secured to the shaft 21 such that it rotates therewith. This cam is in position to engage the cam roller 91 during the forward stroke of the machine and to force the cam roller 91 downwardly. During the forward stroke of the machine the shaft 76 is therefore rotated in a clockwise direction as viewed in FIGS. 2 and 10 or in a counterclockwise direction as viewed in FIG. 5. This returns the arm 80 to its latching position illustrated in FIG. 5 and permits the arm 70 to ride the cam periphery of the clutch member 41 until it assumes its raised position where it lies in the path of the clutch member 41 as viewed in FIGS. 2 and 10.

To protect against the possibility that a motor bar depression could prematurely start a forward stroke before completion of the return stroke, a pawl 93, best shown in FIG. 10, is pivotally mounted on the cam 92 through a pin 94 and is biased in a clockwise direction with respect thereto by a spring 95. Clockwise movement of the pawl with respect to the cam 92 is limited by its engagement with a pin 96 mounted on the cam 92.

When an operating cycle is started by operation of the motor bar and counterclockwise rotation of the shaft 76 as viewed in FIGS. 2 and 10, the arm 90 and the cam roller 91 move upwardly such that the cam roller lies high in the path of the pawl 93. Ensuing clockwise rotation of the shaft 21 and the cam 92 causes the pawl 93 to bear against the cam roller 91, whereupon the pawl 93 lags behind the cam 92 against the action of the spring 95. Toward the end of the forward stroke the pawl 93 snaps to a position over the roller 91 under the influence of the spring 95.

During the return stroke of the machine the cam 92 withdraws from the cam roller 91 but the pawl 93 remains above and in contact with the cam roller and holds it down almost to the end of the return stroke, at which time the pin 96 forces the pawl off the cam roller. Accordingly, if the motor bar is released at any time prior to the last few degrees of the return stroke of the machine, the arm 80 of FIG. 5 will latch on the arm 83, and the arm 70 of FIG. 2 will be arranged in the path of the clutch element 41 to cause disengagement of the clutch elements and interruption of the drive.

If a repeat operation is desired, the motor bar is held down throughout the first stroke. In this case the cam roller 91 will nevertheless be forced downwardly by the cam 92 during the latter part of the forward stroke and will be held down by the pawl 93 during almost the entire return stroke. During this period the arm 80 of FIG. 5 will be in its latching position, and the arm 70 of FIG. 2 will lie in the path of the clutch element 41. However, since the arm 83 of FIG. 5 is held down by the motor bar, the arm 80 of FIG. 5 will not latch in its raised position, and when the pawl 93 of FIG. 10 slips off the cam roller 91 near the end of the return stroke, the arm 80 of FIG. 5 will again be drawn down by the spring 81 and the arm 70 of FIG. 10 will be moved downwardly out of the path of the clutch member 41. A repeat stroke will therefore follow. Whether or not the clutch members 39 and 41 disengage momentarily at the end of one operating cycle and before a repeat cycle starts depends upon the rapidity of operation of the load devices under the influence of the base springs 20 and any dashpot which may be employed. In any event, the repeat cycle starts immediately after the load devices complete their operation and the pawl 93 releases the cam roller 91.

When the arm 70 of FIG. 9 is permitted to remain in the path of the clutch member 41 at the end of an operating cycle, the clutch member 41 is forced to pivot about the pin 40a in a counterclockwise direction such that the tooth 42 thereon is withdrawn from the clutch member 39. This disengages the clutch and interrupts the drive means. Because of the suddenness of the stop of the clutch member 41 there is a tendency to rebound, with possible reengagement of the clutch members. In order to avoid this a pin 97 is secured to the plate 40 as seen in FIG. 3. Arranged above the pin 97 is an arm 98 having a cam 98a which is engageable with the pin 97. The arm 98 is pivotally mounted on the shaft 35 and is urged in a clockwise direction by a spring 99.

Near the end of an operating cycle the pin 97 engages the left-hand side of the cam 98a as viewed in FIG. 3, raises the arm 98 against the action of the spring 99, passes under the cam, and permits the arm 98 to return to its normal position. The pin 97 is then in the position which it assumes at the end of an operating cycle, this position being illustrated in FIG. 3. At this point the arm 70 of FIG. 10 may cause disengagement of the clutch member 41 from the clutch member 39. Rebounding of the clutch member 41 is prevented by engagement of the pin 97 with the right-hand edge of the cam 98a.

*Motor control apparatus*

When the motor bar is depressed to initiate a cycle of operation of the machine, it is also desirable that it cause energization of the motor. This is accomplished through the closing of a switch upon depression of the motor bar and opening of the same switch at or near the completion of the cycle of operation.

Referring particularly to FIGS. 2 and 11, when the motor bar is depressed, the shaft 76 is caused to rotate in a counterclockwise direction as viewed in FIG. 11 and as described above. This causes the arm 75 and the pin 74 carried thereby to swing downwardly in FIG. 2. The pin 74 in addition to bearing down on the arm 72 as described above, also bears down on an arm 101 which forms a yoke with another arm 102, the yoke being freely pivotable about the shaft 71. The arm 102 has an ear 102a thereon which overlies one end of a bent lever 103 which may also be seen in FIG. 1.

The lever 103 is pivotally mounted through a pin 104 on an arm 105 which pivots freely on the shaft 21. Secured to or integral with the arm 105 is another arm 106 which preferably forms a yoke with the arm 105. A spring 107 engaging the central portion of the lever 103 urges the lever to the right in FIG. 11 whereby the arms 105 and 106 are urged in a clockwise direction. Clockwise movement of these arms is limited by engagement of the arm 106 with the pin 56, pivotally connecting the link 54 and the arm 55, as previously described. The arm 103 has an enlarged portion 103a with a large opening through which a fixed pin 108 passes, a large washer 109 being arranged on the pin 108 and holding the enlarged portion 103a of the lever 103 loosely against a frame plate of the machine.

It will now be seen that when the arm 102 bears down against the left end of the lever 103, the latter will be caused to pivot about the pin 104 at its right-hand end. This draws a shoulder 103b downwardly out of engagement with an ear 110a on a lever 110 best shown in FIGS. 2 and 11. The lever 110 is pivotally mounted at its lower end 111 and is pivotally connected at its upper end to an arm 112 through a pin 113. Referring again to FIG. 1, a spring 114 is shown secured at one end to the pin 108 and at its other end to the ear 110a on the lever 110. Accordingly, as the arm 102 moves the lever 103 out of the path of the ear 110a, the spring 114 pivots the lever 110 in a clockwise direction as viewed in FIG. 11 and draws the arm 112 to the right. This permits closing of contacts in a switch 115 and causes energization of the motor 22 through any suitable circuit.

Deenergization of the motor 22 is accomplished by the lever 103 again bearing against the ear 110a and moving the lever 110 and the arm 112 to the left. This is accomplished by the previously described arms 105 and 106 of FIG. 1. In the initiation of an operating cycle, the left-hand end of the lever 103 is pressed down so that the ear 110a may move to the right under the influence of the spring 114 as previously described. The ear 110a then overlies the left-hand end of the lever 103. During the forward stroke of the machine, the arms 105 and 106 are permitted to rotate in a clockwise direction under the influence of the spring 107, since the pin 56 moves to the left in FIGS. 1 and 11 with the main operating link 54 as previously described.

As the lever 103 moves to the right, it slides out from under the ear 110a such that the left-hand end thereof is raised, this movement being urged by the angle of the spring 107 and being permitted by the widely slotted portion 103a of the lever. The shoulder 103b of the lever is therefore again arranged to the right of the ear 110a. During the return stroke of the machine, the pin 56 bears against the arm 106 and causes counterclockwise movement of the arms 105 and 106. This forces the lever 103 to the left whereby it bears against the ear 110a, moves the lever 110 and the arm 112 to the left, and reopens the switch 115 to deenergize the motor 22.

It will now be seen that control apparatus has been described which causes energization of the main drive motor upon initiation of an operating cycle by depression of the motor bar. Control apparatus has also been described for deenergizing the motor upon completion of an operating cycle.

In the event that a repeat operation is called for by continued depression of the motor bar, the motor may be either continuously energized or reenergized after the first stroke, depending upon the speed of operation of the load devices under the influence of the base spring and any dashpot which may be employed. In any event, the repeat cycle starts immediately after the load devices complete their operation and the pawl 93 releases the cam roller 91 such that the arm 102 again forces the left-hand end of the lever 103 down.

An additional switch 116 seen in FIGURES 5 and 6 may be employed to prevent operation of the motor 22 whenever a hand crank is employed to drive the machine to test its operation, or for other reasons. It is desirable that the motor be so deenergized when the hand crank is applied since energization of the motor with the hand crank inserted may result in injury to the operator.

The right-hand end of the shaft 21 is squared to receive such a hand crank 117. Insertion of the hand crank on the squared end of the shaft 121 forces a lever 118, pivotally mounted at 119, to pivot in a clockwise direction from the position shown in FIG. 5 to that shown in FIG. 6. As is shown in FIG. 5, the contacts 120 of the switch 116 are closed when the arm 118 is in its normal position, whereas they are open as shown in FIG. 6 when the arm 118 is pivoted in a clockwise direction. The contacts 120 are of course arranged in the power circuit of the motor 22 such that when the contacts are open the motor cannot be energized.

Complete drive means for a calculating machine have now been shown, along with the controls therefor. The control means shown in the drawings and described above include means for causing engagement and disengagement of the clutch members 39 and 41 and means for opening and closing the motor switch 115, all at appropriate times within the operating cycle of the machine. As has been indicated above, the cam 51 of FIG. 3 drives the cam follower 52 during the forward stroke of the machine, after which the base springs 20 acting through the sector 60 drive the machine during the return stroke. Since retarding means, such as a dashpot, are conventionally operative during the return stroke of a calculating machine, the shaft 21 may tend to lag behind the drive means. In such case the cam follower 52 is free to move clear of the cam 51 during the return stroke of the machine. This arrangement is generally desired in a calculating machine since it assures that during the return stroke, when the machine is particularly susceptible to injury by too rapid operation, the various load devices are driven by a limited, resilient force, as well as at a controlled speed which will permit proper sequential operation of the various load devices.

With such a drive means it will be seen that the motor, during the forward stroke, provides the required energy for both the forward stroke and the return stroke of the machine with the result that it must be capable of exerting twice the force that would be required if the motor were to drive the machine throughout the forward and return strokes. This calls for a larger motor than would otherwise be required and not only makes the overall machine bigger, heavier and more costly, but, in itself, adds to the inertia which must be overcome when the motor is first energized.

Figure 7:
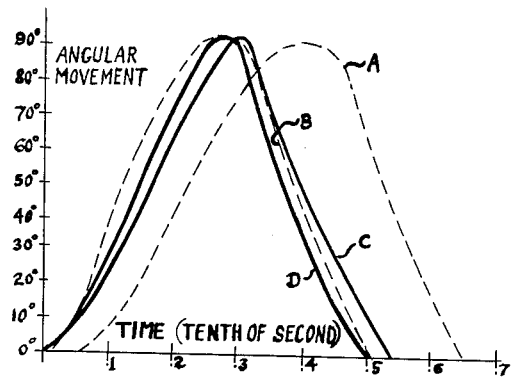
FIG. 7 is a chart illustrating the speed of operation of a machine constructed in accordance with the present invention for both single stroke operation and repeat operation, as compared to a similar machine lacking the features disclosed and claimed herein.
Figure 4:
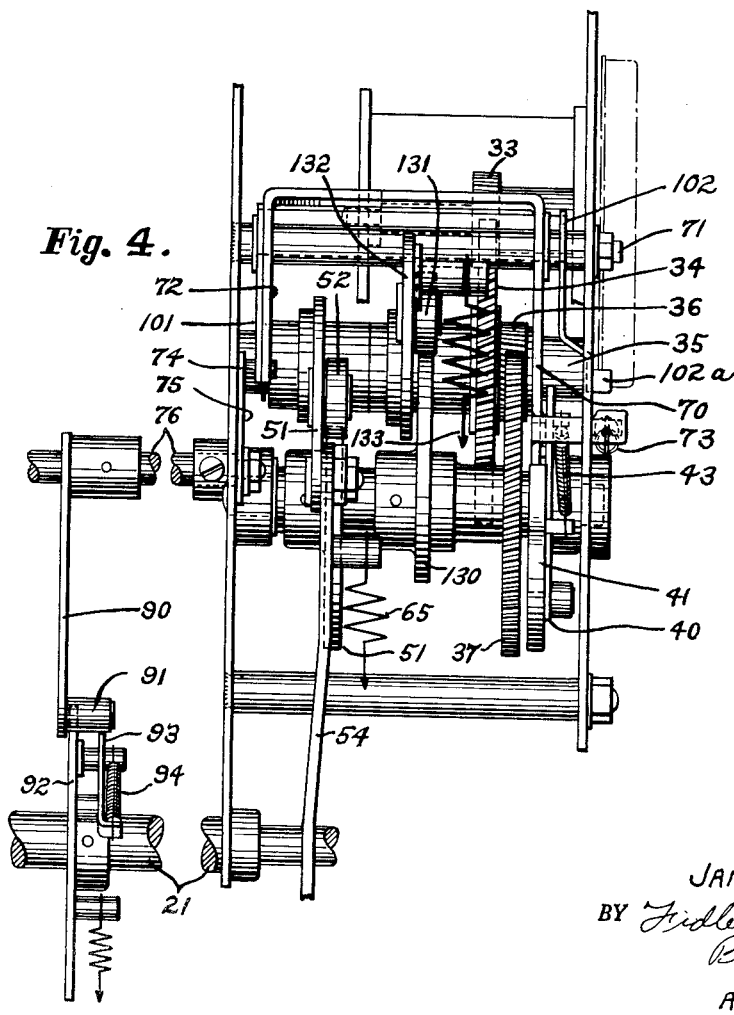
FIG. 4 is a bottom view of the rear or left-hand portion of the apparatus shown in FIG. 1.

In the event of a repeat stroke, where the motor is not brought to rest at the end of each stroke, a very substantial difference in the speed of operation will result, as is illustrated in FIG. 7. In that figure the curve A shows the angle of movement plotted against time in a single stroke operation in a machine such as that which has so far been described above. The curve B is characteristic of a repeat cycle of the same machine. It will be readily apparent that there is a substantial difference in the time for completion of a cycle, depending upon whether the motor starts from a standing position or from a running position. This results very largely from the fact that the large motor itself provides considerable inertia which must be overcome in starting a single cycle or the first cycle of a repeat operation.

As opposed to this wide discrepancy in the operating time for a single cycle and a repeat cycle, the curves C and D very nearly overlie each other, the curve C being characteristic of a single cycle and the curve D being characteristic of a repeat cycle for the illustrated machine having load distributing means applied thereto as described below. These load distributing means distribute the load over the entire cycle of operation whereby the maximum torque and power are greatly reduced and a smaller motor may be employed. This smaller motor is much more readily accelerated to running speed. It is this factor which accounts primarily for the similarity of the curves C and D as opposed to the substantial dissimilarity of the curves A and B.

*Load distributing apparatus*

The load distributing means includes a cam 130 secured to the shaft 38, and a cam follower 131 rotatably mounted on an arm 132 which is freely rotatable on the shaft 35. One end of a tension spring 133 engages a pin 134 at the free end of the arm 132, and its other end is secured to the frame of the machine. When the cam 130 forces the cam follower 131 rearwardly, or to the left in FIG. 3, this expands or energizes the spring 133. When the cam 130 permits the return of the cam follower 131 forwardly, the spring 133 is permitted to contract whereby the spring, acting through the cam and cam follower, urges rotation of the shaft 38.

In FIG. 3 the load distributing means and a portion of the cam drive means are shown in their normal positions; that is, the positions occupied at the end of an operating cycle. When the motor bar is depressed to cause engagement of the clutch members 39 and 41 and to energize the motor 22, all as described above, ensuing clockwise rotation of the shaft 38 as viewed in FIG. 3 causes the cam 51 to move the cam follower 52 rearwardly. This draws the link 54 rearwardly to drive the calculating machine through its forward stroke and energize the return spring means.

In accordance with the present invention this double load is shared by the motor 22 and the load distributing means. It will be seen that during this forward stroke the cam follower 131 of the load distributing means rides along a portion of the cam 130 which slopes inwardly or toward the axis of the cam. Accordingly the previously energized spring 133 encourages rotation of the shaft 38 such that it aids the motor 22. During the initial part of this forward stroke the spring 133 is under greater tension than it is during the latter part of the forward stroke when the spring has partially relaxed. Accordingly the spring 133 exerts a greater force during the first part of the forward stroke than it does during the latter part. For this reason the cam 130 has a steeper slope in engagement with the cam follower during the latter part of the forward stroke than during the first part. In other words, the cam is so shaped as to permit slower relaxation of the spring during the initial part of the forward stroke than during the latter part. This tends toward a uniform flow of power from the spring 133 to the shaft 38 during the entire forward stroke, even though the force exerted by the spring diminishes throughout the forward stroke of the machine. This change in the slope of the cam is readily seen in FIG. 3.

During the return stroke of the machine the load is carried by the base spring with the result that no load is imposed on the motor 22. Accordingly, it is during this return stroke that the motor 22 reenergizes the spring 133. It may readily be seen in FIG. 3 that during the second half of the operating cycle, that portion of the cam which engages the cam follower 131 slopes outwardly away from the shaft 38. This drives the cam follower rearwardly to expand the spring 133. It may also be seen in FIG. 3 that that portion of the cam 130 which engages the cam follower during the initial part of the return stroke is steeper than that portion which engages the cam follower during the latter part of the return stroke. This produces more rapid energization of the spring 133 when the spring is relatively relaxed and more gradual energization of the spring as it becomes more taut. This tends toward uniform flow of power from the motor to the spring 133.

The shape of the cam 130 may also be such that the load distributing means complements the individual effect of the various load devices. For example, if during the forward stroke there is an interval when the load devices impose a relatively light combined load on the drive shaft, the cam 133 may be made relatively flat (circular) over the corresponding angle such that the load distributing means carries a relatively minor share of the load. Similarly if the combined load of the various load devices is to produce a relatively heavy load over a small part of the forward stroke, the cam 130 may be made relatively steep over the corresponding angle whereby the load distributing means carries a major portion of the load.

It will now be understood that the provision of a low point on the cam 130 corresponding to the end of the forward stroke of the machine and a high point corresponding to the end of the return stroke of the machine, with a reasonably gradual slope therebetween, cause energization of the load distributing spring 133 during the return stroke and a flow of power from the spring 133 to the common drive means during the forward stroke, whereby the combined load of the various load devices and the load biasing means is distributed over the forward and return strokes of the machine. Furthermore, uniformity of load throughout the forward stroke and throughout the return stroke may be closely approached by provision of the proper slope of the cam to complement the varying force exerted by the spring as it becomes more relaxed or more taut. More specifically, the slope may be increased where the spring is more relaxed, and may be decreased where the spring is more taut.

Still further, the slope of the cam over that portion corresponding to the forward stroke of the machine may be varied over selected angles corresponding to a greater or lesser combined load imposed on the drive shaft 21. By such control of the slope of the cam 130 the combined load may not only be distributed between the forward and return stroke but, to a limited extent, may be uniformly distributed over both the forward stroke and the return stroke. The extent to which uniformity of motor load may be obtained is limited by the fact that various of the load devices impose varying loads on the motor, depending upon various conditions such as the setting of keys prior to the initiation of the operating cycle, all as is well understood by those skilled in the art. Accordingly, the primary function of the load distributing means is to distribute the load between the forward and return strokes of the machine, and a secondary function is to complement the combined load to make it as nearly uniform as is practical over each of these strokes.

An important factor of the present invention is that load distributing means are provided which operate on common drive means of the machine, and which may nevertheless be arranged to distribute the load on the motor substantially uniformly, even though various load devices impose their own individually characteristic loads on the drive means over different angles of the operating cycle, and even though these loads are concentrated in a single 180° angle of the operating cycle. Through the use of a cam, it is possible to produce a substantially uniform energization and deenergization of the load distributing spring 133 even though the spring exerts a greater or lesser force depending upon its degree of tension.

The artificial imposition of positive or negative forces on the drive means by such load distributing means as that disclosed in the drawings and described above permits the use of a smaller drive motor since the peak load on the motor is much smaller than would be the case where such load distributing means are not employed. The smaller motor which may thus be employed may have a correspondingly smaller inertia whereby the motor, along with the various driven elements, may be more rapidly accelerated to normal operating speed.

Attention is again directed to FIG. 7 wherein it is seen that the curves C and D, representing, respectively, a single cycle and a repeat cycle, very nearly overlie each other, even though the drive motor starts from a standing position for a single cycle and from a running position for a repeat cycle. This is opposed to the wide discrepancy between the curves A and B representing, respectively, a single cycle and a repeat cycle for a machine which has no load distributing means but which is otherwise very similar to the machine of which the curves C and D are characteristic. The sharper peaks of the curves C and D as compared to the curves A and B may be accounted for largely by a modified drive system, but the near coincidence of the curves C and D as opposed to the substantial difference in operating time shown by the curves A and B results primarily from the use of the load distributing means on the machine of which the curves C and D are characteristic. Accordingly the smaller drive motor permitted by the use of the load distributing means shown and described herein not only results in a smaller, lighter and less costly machine, but produces more uniform speed of operation as between single cycle and repeat operation.

It will be apparent that the invention may be varied in its physical embodiment without departing from the spirit of the invention, and it is desired, therefore, that the invention be limited only by the scope of the appended claims.

The invention having thus been described, what is claimed and desired to be secured by Letters Patent is:

1. In a calculating machine of the type including a motor for driving the machine during the forward stroke of the machine cycle and a spring for driving the machine during the return stroke of the machine cycle, energy being transferred from said motor to said spring during the forward stroke, the combination of a first shaft connected to said motor for rotation through 360 degrees, a rock shaft, means drivingly connecting said first shaft to said rock shaft to rotate said rock shaft in one direction during said forward stroke and to permit rotation of said rock shaft in the opposite direction during the return stroke, means connecting said spring to said rock shaft to transfer energy to said spring from said rock shaft during said forward stroke and to transfer energy from said spring to said rock shaft during said return stroke, a cam secured to said first shaft, a cam follower, a second spring fixedly positioned at one end and connected at its other end to said cam follower for urging said cam follower into contact with said cam, said cam being shaped to move said cam follower in a direction to cause the transfer of energy to said second spring from said first shaft during the return stroke and to cause the transfer of energy from said second spring to said first shaft during the forward stroke, thereby to stabilize the load applied to said motor during a full machine cycle.

2. The combination set forth in claim 1 wherein said rock shaft is rotated through approximately 90 degrees during each of said forward and return strokes.

References Cited in the file of this patent
UNITED STATES PATENTS

| | | |
|---|---|---|
| 1,404,183 | Augustine | Jan. 24, 1922 |
| 1,416,363 | Landsiedel | May 16, 1922 |
| 1,549,101 | Wales | Aug. 11, 1925 |
| 1,853,050 | Horton | Aug. 12, 1932 |
| 2,217,596 | Munschauer | Oct. 8, 1940 |
| 2,357,571 | Anderson | Sept. 5, 1944 |
| 2,493,799 | Anderson | Jan. 10, 1950 |